United States Patent
Edge et al.

(10) Patent No.: US 7,454,217 B2
(45) Date of Patent: Nov. 18, 2008

(54) METHOD AND APPARATUS FOR WIRELESS NETWORK TIMEKEEPING AND SYNCHRONIZATION

(76) Inventors: Stephen William Edge, 1109 Landavo Dr., Escondido, CA (US) 92027; Yaser Abdel Rehem, 667 Brighton Rd., Pacifica, CA (US) 94044

(*) Notice: Subject to any disclaimer, the term of this patent is extended or adjusted under 35 U.S.C. 154(b) by 902 days.

(21) Appl. No.: 09/971,990

(22) Filed: Oct. 4, 2001

(65) Prior Publication Data
US 2003/0069033 A1    Apr. 10, 2003

(51) Int. Cl.
*H04B 7/015*    (2006.01)

(52) U.S. Cl. .................. 455/502; 455/507; 342/357.06; 342/357.12

(58) Field of Classification Search ................ 455/13.2, 455/502, 456, 517, 524, 503, 456.1, 456.5, 455/456.6; 342/357.06, 357.1, 357.12, 357.02; 701/213, 214
See application file for complete search history.

(56) References Cited

U.S. PATENT DOCUMENTS

| | | | |
|---|---|---|---|
| 5,945,944 A * | 8/1999 | Krasner | 342/357.06 |
| 6,061,573 A * | 5/2000 | Goldberg | 455/503 |
| 6,094,168 A | 7/2000 | Duffett-Smith | |
| 6,150,980 A | 11/2000 | Krasner | |
| 6,204,808 B1 * | 3/2001 | Bloebaum et al. | 342/357.07 |
| 6,208,871 B1 * | 3/2001 | Hall et al. | 455/517 |
| 6,430,415 B1 * | 8/2002 | Agashe et al. | 455/456.5 |
| 6,788,249 B1 * | 9/2004 | Farmer et al. | 342/357.12 |
| 7,006,036 B2 * | 2/2006 | Farmer | 342/357.05 |
| 2003/0084190 A1 * | 5/2003 | Kimball | 709/248 |
| 2004/0032836 A1 * | 2/2004 | Grilli et al. | 370/252 |
| 2004/0190378 A1 * | 9/2004 | Farmer | 368/47 |
| 2005/0146462 A1 * | 7/2005 | Abraham et al. | 342/357.02 |
| 2008/0018530 A1 * | 1/2008 | Farmer | 342/357.02 |

FOREIGN PATENT DOCUMENTS

| | | |
|---|---|---|
| EP | 1118871 A2 | 7/2001 |
| WO | WO 00/73814 A1 | 12/2000 |

* cited by examiner

*Primary Examiner*—Binh K Tieu

(57) ABSTRACT

A system, method, apparatus, and means for generating timing information in a wireless communication network comprises detecting, at a mobile unit, accurate timing information, wherein the mobile unit is in a cell area serviced by a base station. Association data is generated which associates the accurate timing information with base station timing information maintained by the base station. Network timing information is updated by using or storing the association data. Pursuant to embodiments of the present invention, the association data is stored and maintained at a central network authority from where it may be disseminated to mobile units and base stations in the network.

24 Claims, 5 Drawing Sheets

METHOD AND APPARATUS FOR WIRELESS NETWORK TIMEKEEPING AND SYNCHRONIZATION

BACKGROUND OF THE INVENTION

1. Field of the Invention

The present invention relates generally to wireless communications systems and networks and, more particularly, to improved timekeeping and synchronization of wireless communications systems and networks.

2. Description of the Related Art

Wireless communications systems and networks are rapidly advancing in capability and spreading in use. An example of a type of wireless communications system are cellular telephone systems which are commonplace everywhere in the world. These, and other, wireless networks (e.g. GSM, TDMA, CDMA) require accurate timing information to operate and to support new applications which are being developed. The accurate timing information may be needed in both the networks and the handsets (herein generically referred to as "mobile units"). Examples of network operations that could be assisted by accurate timing information include delivery of accurate time of day information to mobile units and synchronization of network timing—e.g. in base stations—to a common absolute time reference, which may be useful or even essential to some wireless technologies.

Wireless communications systems, and the mobile units they support, may also require precise timing information to allow accurate positioning of mobile units in the network with certain positioning technologies. Many countries, such as the United States (US), are beginning to require that network operators be able to quickly and accurately pinpoint the location of cellular telephones and devices in their networks. In particular, starting in October 2001, the US's Federal Communications Commission is requiring that mobile telephones sold in the US must be capable of being located with high probability to within 50 or 100 meters (depending on whether the positioning method is considered to be mobile unit or network centric, respectively) when the user places an emergency 911 call. Further, many applications, such as maps, direction finding, fleet management, child/spouse location, are being developed for mobile units which require accurate positioning information. Accurate timing information is required by certain positioning technologies to support such applications and positioning requirements.

Wireless communications systems and networks may also require precise timekeeping to achieve accurate timing in mobile units within the network. This timing information may be important to users of the units and to applications supported within the units and may also be used to improve operation of the units in conditions of faint signal strength.

A number of different techniques have been suggested to achieve precision timing in wireless communications systems and networks. One technique is to install Global Positioning System (GPS) clocks at each base station within the network. GPS clocks are GPS receivers that, given their precise geographical location, resolve GPS-time. GPS clocks allow each base station to benefit from the highly accurate clock signals received from the GPS constellation of satellites. In one application, the transmission timing of each base station may be synchronized to absolute GPS time. In such a case, absolute GPS time would be directly available to mobile units within the network by observing the transmission from any local base station. In another application, the knowledge of absolute GPS time by a base station could be used to accurately timestamp certain events. For example, certain uplink network centric positioning methods operate by means of timestamping the arrival of signals from a mobile unit at a number of different geographically dispersed base stations. The time differences between the arrival of a signal from the mobile unit at different base stations, which may be obtained from the timestamping information, may then be used to calculate the geographic position of the mobile unit when the known geographical positions of the base stations are also taken into account. Unfortunately, however, installation of GPS clocks at each base station increases the cost and complexity of building and maintaining a wireless network.

Another technique to achieve precision timing is to integrate a number of location measurement units (LMUs) into the network. LMUs are devices that may be used to obtain accurate information on relative or absolute timing. To obtain relative timing, a LMU may measure the arrival of transmission timing information from pairs of nearby base stations. In particular, a LMU may measure the apparent difference in the timing information transmitted by each base station in any pair (e.g. by measuring the difference in the arrival time at the LMU of some common timing related marker in the transmission signals from each base station).

Because the timing information from each base station reaches the LMU after a certain delay proportional to the distance between the base station and the LMU, the apparent difference in timing between two base stations, as measured by the LMU, needs to be corrected by adding or subtracting (depending on whether time advance or time lag is to be treated positively) the difference between the respective propagation delays to obtain the real difference in timing between the base stations. The difference in the propagation delays can generally be known very accurately from the geographic positions of these entities. The correction may be performed by the LMU or by some central network entity that receives measurements from the LMU. The end result is knowledge by the network of the relative differences in the local transmission timings of the base stations. These timing differences may then be employed to assist with certain positioning methods, such as the E-OTD position method used in GSM.

LMUs may also be employed to measure the association between the local transmission timing of any base station and some absolute time reference like GPS time. In this case, the apparent time difference observed at the LMU must also be corrected by taking account of the propagation delays between the LMU and the base station and between the LMU and any GPS satellite source. The ensuing corrected time associations, which are now with respect to an absolute time source, may be used to support many applications including a number of geographical position methods like E-OTD and various enhancements of GPS.

Unfortunately, these LMU based approaches require the use of additional equipment and integration, thereby increasing the overall cost and complexity of building and maintaining the wireless network. The cost of implementing and deploying such LMUs could be a significant proportion of the overall infrastructure cost in a wireless network.

It would be desirable to provide a system and method for timekeeping and synchronization of wireless communications systems and networks which overcomes the drawbacks of previous systems and methods. It would be desirable to provide a system and methods which allow accurate absolute and relative timing in wireless networks. It would further be desirable to provide a system and methods which allow accurate timing to be achieved without expensive or additional network equipment, such as LMUs and/or GPS clocks integrated into base station equipment.

SUMMARY OF THE INVENTION

To alleviate the problems inherent in the prior art, and to allow a wireless network to obtain and maintain accurate relative or absolute timing information for each of its base stations without significant expense for specialized extra equipment.

According to one embodiment of the present invention, a system, method, apparatus, and means for generating timing information in a wireless communication network comprises capturing or detecting, at a mobile unit, accurate timing information from some common source, wherein the mobile unit is in a cell area serviced by a base station. Association data is generated which associates the accurate common timing information so captured or detected with base station timing information maintained and transmitted by the base station. Network timing information is updated by sending the association data to some central network entity or authority and storing it therein. Pursuant to embodiments of the present invention, the association data from a multiplicity of mobile units is then combined, stored and maintained at the central network authority. In some embodiments, the accurate common timing information is GPS timing data received by a GPS receiver of the mobile unit.

The present invention is not limited to the disclosed preferred embodiments, however, as those skilled in the art can readily adapt the teachings of the present invention to create other embodiments and applications.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION

Figure 1:
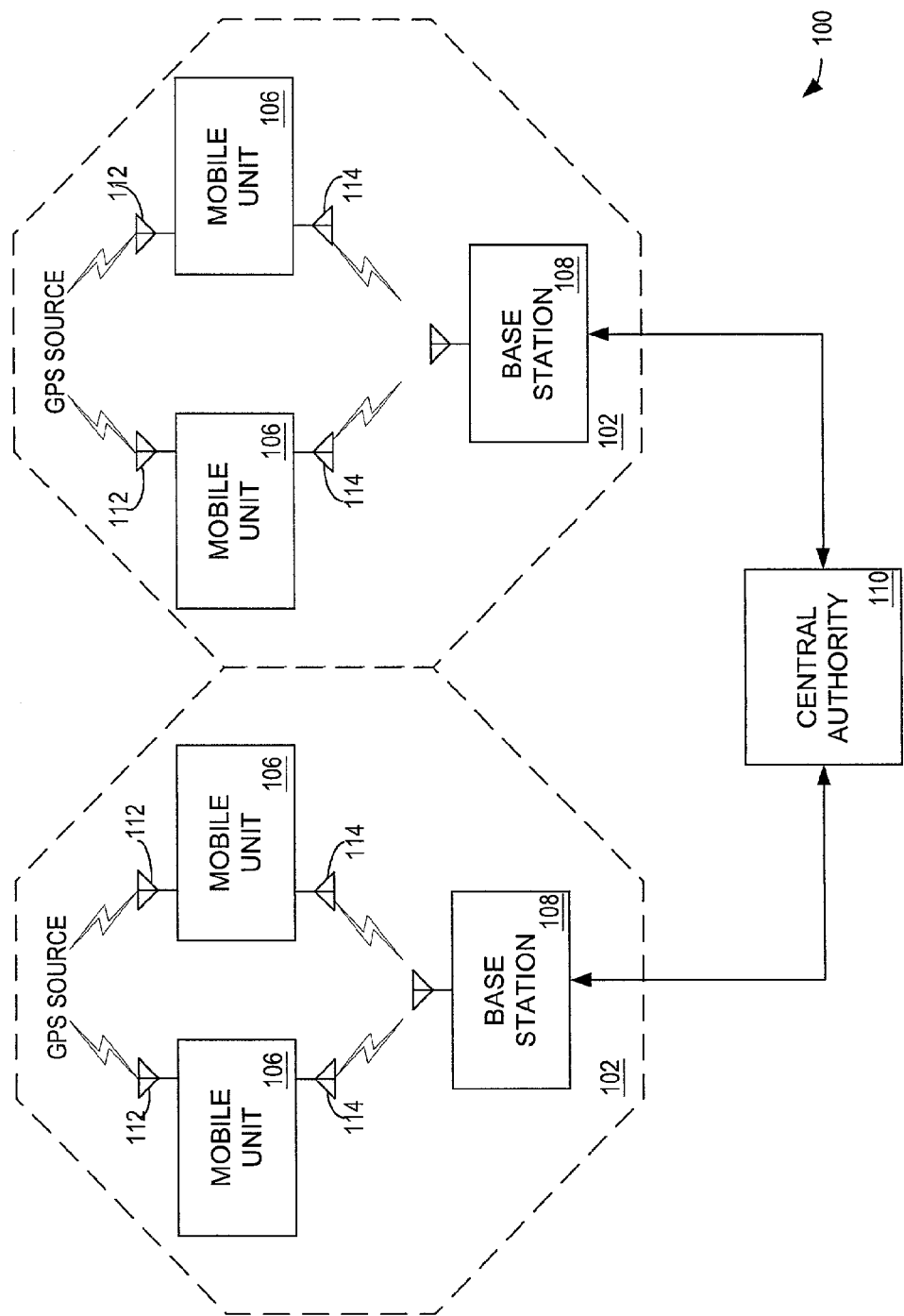
FIG. 1 is diagram illustrating an exemplary wireless network according to one embodiment of the present invention.

The following description is provided to enable any person skilled in the art to make and use the invention and sets forth the best modes contemplated by the inventor for carrying out the invention. Various modifications, however, will remain readily apparent to those skilled in the art.

Network

Features of embodiments of the present invention will now be described by first referring to FIG. 1, where a wireless communication network 100 is shown. In the embodiment depicted, wireless communication network 100 includes several cells 102 each having at least one base station 108 and a number of mobile units 106. Those skilled in the art will recognize that wireless communication network 100 may utilize any of a number of different technologies, including, without limitation: the Global System for Mobile Communications (GSM); code division multiple access (e.g., CDMA IS-95, cdma2000), Wideband CDMA (W-CDMA), or the like. For the purposes of describing features of embodiments of the present invention, wireless communication network 100 will be described as utilizing the GSM system. Upon reading this disclosure, those skilled in the art will recognize that features of embodiments of the present invention may be utilized with other technologies in other wireless communications networks and systems.

A number of mobile units 106 within network 100 include both a GPS antenna 112 and a communications antenna 114. Each mobile unit 106 is in communication with at least one base station 108 via communications antenna 114 (e.g., via radio frequency communication with base station 108). As a mobile unit moves geographically between cells, communication will pass from one base station to another.

As depicted, only two cells 102 are shown. Those skilled in the art will recognize that a network will typically contain a larger number of cells. Each cell may include one or more base stations 108 and zero, one or more mobile units 106. Cells 102 may or may not be geographically overlapping and a base station 108 serving a particular cell 102 may be resident in and possibly serve other cells 102. A cell 102 may also include additional equipment to assist with wireless communication such as one or more repeaters by means of which communication with the base station 108 can be extended to mobile units distributed over a larger area (e.g. extended into subways, shopping malls or to a greater distance). Each of the base stations 108, as depicted, are in communication (directly or indirectly) with a central authority 110. Central authority 110, pursuant to embodiments of the present invention, maintains an association of timing differences between an accurate time (e.g., in some embodiments, GPS time) and base station time for each base station 108.

Pursuant to embodiments of the present invention, this association is updated on an on-going basis within network 100. By maintaining this association, embodiments of the present invention permit accurate and effective timekeeping in wireless networks. The association may be used for a number of different purposes, including, for example, supporting handovers as mobile units 106 pass between cells 102, aiding in the accurate location of the position of mobile units 106 within network 100, providing accurate timing in mobile units 106 and base stations 108, improving network operation in conditions of faint signal strength, or the like.

Communication between base station 108 and central authority 110 may be direct or it may proceed through one or more intermediate entities. Information transmitted between mobile units 106 and central authority 110 may proceed via base stations 108 or possibly by other means.

The description of the particular network 100 shown in FIG. 1 should not be construed as limiting the present invention to application in a wireless network only. The invention may also be applicable to mobile units supported by a wireless LAN, satellite network and in other networks employing wireless communication by other means (e.g. microwave, infrared). In these networks, there may not necessarily be base stations or even specifically demarcated cells, although there should be devices comparable to base stations (e.g. satellites, wireless routers) that provide a transmission timing reference to mobile units and for which the method of precision timekeeping described herein would then be applicable.

Similarly, although a single central authority 110 is shown in the network of FIG. 1, those skilled in the art will recognize that a number of central authorities may be utilized to provide features of embodiments of the present invention. Multiple central authorities 110 may be used, for example, to provide redundancy, to support different portions of the network, or the like.

Mobile Units

Figure 2:
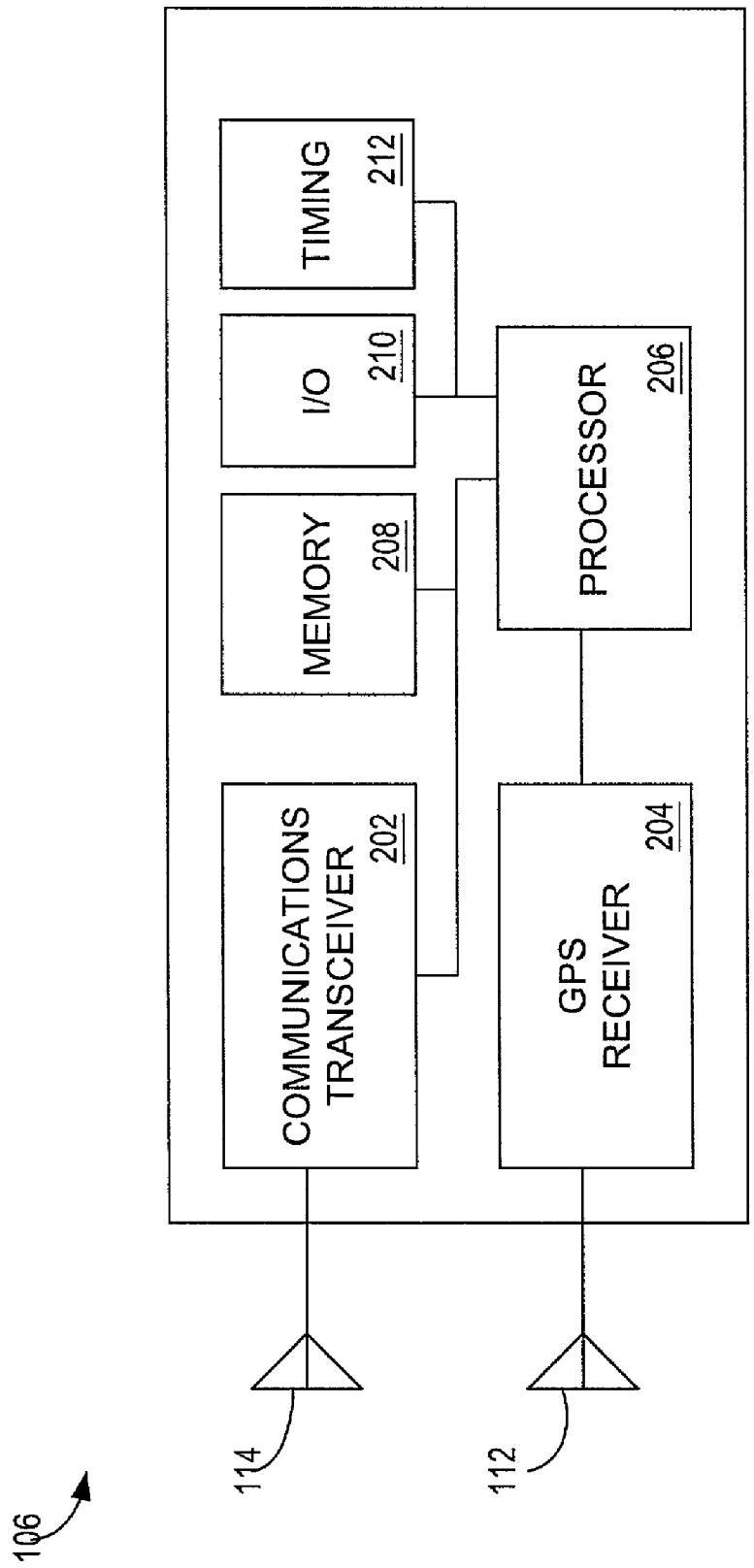
FIG. 2 is a block diagram illustrating portions of mobile units of FIG. 1 according to one embodiment of the present invention.

Referring now to FIG. 2, a detailed block diagram of components of mobile unit 106 is shown. Mobile unit 106 may be any of a number of different types of devices, including, for example, a cellular phone, a laptop computer, a personal digital assistant (PDA), a watch, or any other wireless communications device including those that are fixed or non-moving. As depicted, mobile unit 106 includes two antennas, a GPS antenna 112 and a communications antenna 114 which are in communication with a GPS receiver 204 and a communications transceiver 202, respectively. GPS receiver 204 may be any of a number of GPS receivers now known or later developed for receiving GPS data and signals via GPS antenna 112. In addition to receiving RF GPS signal data, GPS receiver 204 may also be used to perform further processing. For example, GPS receiver 204 may be used to obtain GPS pseudo-ranges (depending on the variation of GPS being used). Although depicted as a receiver, in some embodiments, GPS receiver 204 may also be configured as a transceiver to transmit data as well as receive data. In some embodiments, a single antenna may be provided to serve the functions of GPS antenna 112 and communications antenna 114.

Communications transceiver 202 may be any of a number of communications transceivers or similar devices now known or later developed for sending and receiving signals via communications antenna 114 (e.g., such as devices used to send and receive GSM transmissions in a GSM wireless communications network). Those skilled in the art will recognize that the functionality provided by receiver 204 and transceiver 202 may be implemented using a variety of different devices and components.

Mobile unit 106 also includes a processor 206 in communication with a memory 208, I/O 210 and a timing device 212. Memory 208 may include any of a number of different types of memory, including read only memory (ROM), random access memory (RAM), flash memory, or the like. Memory 208 may be used to store timing and other information used in conjunction with embodiments of the present invention. Memory 208 may also store program code operable to control elements of mobile unit 106 to perform methods of embodiments of the present invention.

I/O 210 may include a variety of different input and output devices provided to facilitate interaction between a user and the mobile device. For example, I/O 210 may include a keypad, a microphone, a display device, a touch screen, etc. Timing device 212 may be, for example, an area of memory reserved for the maintenance and update of timing information. Timing device 212 may also be a dedicated register or timing circuit. In some embodiments, timing device 212 may include one or more counters operating in conjunction with a clock circuit. Upon reading this disclosure, those skilled in the art will recognize that a number of different timing devices 212 may be used to implement features of embodiments of the present invention.

It will also be recognized by those skilled in the art that the functional responsibilities of the elements in FIG. 2 may be combined or partly combined. For example, GPS related functions of the GPS receiver may be supported using the processor, memory, and timing elements. Further elements in the mobile unit may also be present—e.g. special ASIC chips, additional processors, or the like.

Central Authority

Figure 3:
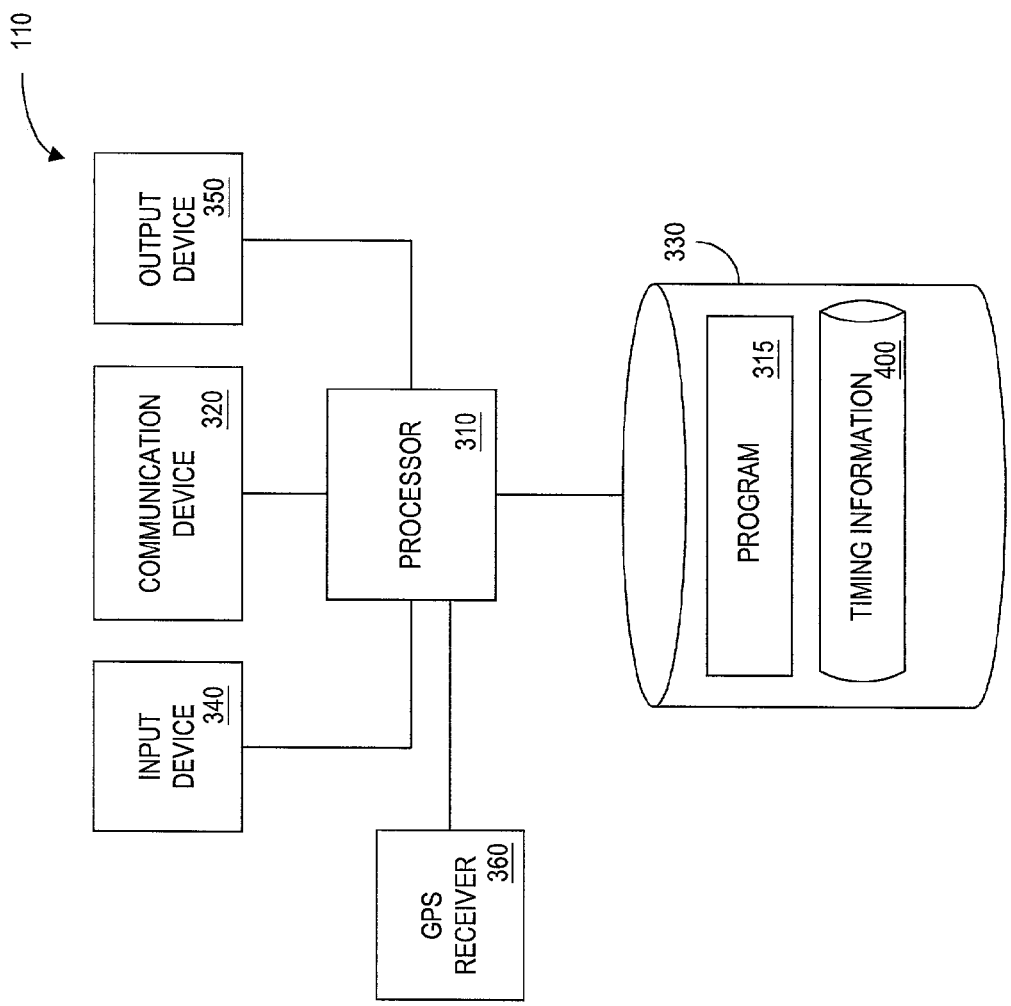
FIG. 3 is a block diagram illustrating portions of central authority of FIG. 1 according to one embodiment of the present invention.

Referring now to FIG. 3, a more detailed view of central authority 110 is shown that is descriptive of central authority 110 of FIG. 1. Central authority 110 may be an existing network device which is adapted to provide the functionality described herein. For example, in a GSM network, central authority 110 may be a Serving Mobile Location Center (SMLC) which has been additionally programmed to receive GPS data and timing information from mobile units 106 via base stations 108, maintain the information to provide an association between GPS time and local base station time, and forward the timing association to mobile units 106 via base stations 108 to ensure that each device has accurate timing information.

In general, central authority 110 comprises a processor 310 coupled with a communication device 320 configured to communicate via a communication network with one or more base stations 108 and with one or more mobile units 106 (FIG. 1). Data, such as timing information, is received from mobile units 106 via base stations 108 and used to update a timing information database 400 stored at, or accessible to central authority 110. Updated timing information is also communicated from central authority 110 to base stations 108 and/or to mobile units 106 via base stations 108.

Processor 310 is also in communication with an input device 340. Input device 340 may comprise, for example, a keyboard, a mouse or other pointing device, a microphone, knob or a switch, an IR port, a docking station, and/or a touch screen. Input device 340 may be used, for example, by a system operator to enter maintenance or other information.

Processor 310 is also in communication with an output device 350. Output device 350 may comprise, for example, a display (e.g., a display screen), a speaker, and/or a printer. Output device 350 may be used, for example, to output system information or the like.

Those skilled in the art will recognize that input device 340 and output device 350 need not be a physical part of central authority 110 nor close to it but may in fact be remote and/or separate. For example, input device 340 and output device 350 may be devices located elsewhere in the wireless network and which may be accessed via other entities in the network.

Processor 310 may also be in communication with a GPS receiver 360 which may be any of a number of GPS receivers or processors now known or later developed for receiving and/or processing GPS data and signals. GPS receiver 360 may be used, for example, to provide data to mobile units 106 to assist with reception and processing of GPS signals and/or, possibly, to compute GPS location and timing information from GPS measurement information detected by mobile units 106. Those skilled in the art will recognize that GPS receiver 360 may be replaced or augmented by other sources of real time GPS information including public sources (e.g., US Coast Guard Navigation Service) and various commercial sources (e.g., OmniSTAR, Racal-Landstar, DCI, Accqpoint). For example, in one embodiment, network 100 may implement features of embodiments of the present invention without any GPS receiver located at central authority. Instead, timing information may be retrieved from commercial information sources. This information may be retrieved via a second network such as, for example, the Internet or the like.

Processor 310 is also in communication with a storage device 330. Storage device 330 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 330 stores one or more programs 315 for controlling processor 310. Processor 310 performs instructions of program 315, and thereby operates in accordance with the present invention. For example, processor 310 may be programmed to derive associations between absolute GPS time and provided GPS signal measurements received from mobile units 106 via their respective base stations 108.

Storage device 330 also stores databases, including, for example, a timing information database 400. This database is described in detail below in conjunction with FIG. 4 and depicted with exemplary entries. As will be understood by those skilled in the art, the schematic illustration and accompanying description of the database presented herein is simply an exemplary arrangement for stored representations of information. A number of other arrangements may be employed besides those suggested by the table shown. Similarly, the illustrated entries of the database represent exemplary information only; those skilled in the art will understand that the number and content of the entries can be different from those illustrated herein.

Figure 4:
FIG. 4 is a diagram illustrating data stored in the central authority device of FIGS. 1 and 3 according to one embodiment of the present invention.

Referring now to FIG. 4, a table represents a timing information database 400 that may be stored at (or accessible by) central authority 110. The table includes entries identifying a number of different timing associations derived from information received from different mobile units 106 within the network. Some entries of the table may include data which has been calculated or derived by central authority 110 using unprocessed or partially processed data received from mobile units 106 via base stations 108. Other entries may include already-derived timing information in situations where mobile units 106 performed the timing derivation. Other timing data may also be provided in timing information database 400.

Timing information database 400, as depicted, includes a number of fields for each entry, including a base station identifier 402, a base station time 404, an absolute GPS time 406, and a base station to absolute GPS correlation 408.

Base station identifier 402 may be information used by the wireless network to specifically identify each base station 108 in the network. As depicted in the table, a stylized base station identifier is used for a network having three base stations ("B0001", "B0002", and "B0003"). Those skilled in the art will recognize that a number of different types of identifiers may be used, e.g., as proscribed by various network standards or the like or as defined to suit a particular network operating authority.

Base station time 404 includes information identifying timing information received by mobile units associated with base station identifier 402. In the example data depicted in FIG. 4, base station time 404 includes GSM frame related information in the form of three integers: frame number modulo 2,715,648, time slot number modulo 8 and bit number modulo 157. Other base station timing data may be provided in other forms and using other formats, depending on the type of timing data used by a particular network.

Absolute GPS time 406 includes information identifying the absolute GPS time detected or captured by a mobile unit 106 at the particular base station time stored in field 404. GPS time 406 may include GPS timing data received in any of a number of different formats (including, for example, the so-called "standard view" or the so-called "common view" formats). GPS time 406 may include a number of data elements received from the GPS satellite transmission which allow accurate rendering of timing information. The capture and representation of GPS time and various GPS time transfer techniques are generally known in the art and need not be further described herein. In the example data depicted in FIG. 4, GPS timing information is depicted as a format including a two digit year, two digit month, two digit day, two digit hour and 10 digit second count.

Timing correlation 408 includes information which correlates the absolute GPS time with base station time. In some embodiments, this correlation is derived by the mobile unit 106 which received the GPS signal. In some embodiments, this correlation is derived by central authority 110 using information provided by the mobile unit 106 which received the GPS signal. In some embodiments, timing correlation 408 may include information on base station time drift (e.g., indicating whether and by how much, the base station timing is running fast or slow) and/or the accuracy of GPS and base station timing and their correlation. In the example data depicted in FIG. 4, timing correlation 408 includes data identifying base station drift data as a signed PPM value down to 0.0001 PPM.

Further details regarding the generation and storage of the data in timing database 400 will be described below. Other types of data may also be stored in timing database 400 or in other related databases to provide precision network timekeeping pursuant to embodiments of the present invention. For example, additional data could include statistics on the timing information provided for any base station such as the number of mobile units that reported information for this base station during some defined preceding time period.

Network Timing

Existing wireless networks, as part of their normal operation, pass timing related information between mobile units 106 and base stations 108. To facilitate an understanding of features of embodiments of the present invention, standard GSM network timing techniques will first be described by referring to both FIG. 1 and FIG. 2. Those skilled in the art will understand that wireless networks configured pursuant to other network standards utilize different timing techniques, each of which may be adapted to utilize features of embodiments of the present invention, just as GSM networks may be adapted. After a description of GSM timing techniques, a description of timing techniques pursuant to embodiments of the present invention will be presented for the GSM environment.

In a normal GSM network, as each mobile unit 106 moves into or powers on in a new cell 102, it is required to synchronize its timing information according to information received from the local serving base station 108 for the new cell 102 and to maintain this synchronization thereafter. Once the synchronization has been performed, timing information in timing device 212 of mobile unit 106 will match the timing information stored in base station 108 except for an offset due to the propagation and signaling delays incurred as a result of transmission from base station 108 to mobile unit 106 (that is, the time indicated by timing device 212 of mobile unit 106 will include a lag, equal to the overall propagation and signaling delays, behind the time indicated by timing devices in base station 108).

The timing devices in base station 108 and mobile units 106 are used to regulate and control transmission and reception in both base station 108 and mobile unit 106. Transmission in GSM networks is partitioned in both the frequency and time domains. In the frequency domain, there are separate physical channels spaced 200 KHz apart that each carry digitized control and user data at approximately 270.833 kbits/second. This stream of data in each physical channel is further partitioned in the time domain into a hierarchy of Time Division Multiple Access (TDMA) frames, multiframes, superframes and hyperframes.

There are 2,715,648 GSM TDMA frames in one GSM hyperframe. Each hyperframe has a duration of 3 hours 28 minutes 53 seconds and 760 milliseconds. This is the longest recurrent time interval in GSM—e.g., rather like a stop clock that is continually reset and restarted from zero whenever this time interval has elapsed. Each TDMA frame is of duration 4.615 milliseconds and consists of 8 timeslots. Each timeslot enables transmission of 156.25 bits, where some bits (e.g. the odd 0.25 bits) are not actually transmitted but compose an equivalent period of non-transmission.

Sequential TDMA frames in each hyperframe are explicitly numbered from 0 through 2,715,647; sequential time slots in each TDMA frame are numbered 0 through 7 and sequential bits in each time slot are numbered 0 through 156 where bit numbers 0 to 155 represent whole bits and bit number 156 represents the final 0.25 bit time. Quarter bit periods are also numbered in each time slot from 0 through 624. The quarter bit period is the smallest maintained interval and is equal to $^{12}/_{13}$ microseconds ($\mu$s) or approximately 0.923 $\mu$s.

Wireless networks complying with GSM standards provide timing devices (such as counters) at each base station 108. These timing devices maintain information identifying: TDMA frame number, time slot number, bit number and quarter bit number. The timing information at each base station 108 is incremented according to timing information derived internally from a single frequency source in each base station 108 with absolute accuracy better than 0.05 parts per million (ppm). The same frequency source is also used in each base station 108 to generate RF transmission frequency (e.g., 1900 MHz range in North America and 900 or 1800 MHz elsewhere). The quarter bit period counter is incremented modulo 625 by the base station 108 every $^{12}/_{13}$ $\mu$S; the bit number counter is set to the quarter bit number divided by 4 (remainder ignored); the timeslot counter is incremented modulo 8 whenever the quarter bit counter changes from 624 to 0 and the frame counter is incremented modulo 2,715,648 whenever the timeslot counter changes from 7 to 0.

Each base station 108 synchronizes transmission on each of its 200 KHz physical channels to match each of these pieces of timing information. In particular, TDMA frames, timeslots and individual bits are numbered and the frame, timeslot and bit numbers currently being transmitted on any channel match the counter values stored in each base station 108. Data from the timing devices or counters themselves are also conveyed explicitly and implicitly within the transmitted bit stream on each channel. Specific timeslots in certain TDMA frames are used for this, collectively known as the "Synchronization Channel". These timeslots are always "timeslot 0" in a TDMA frame with a frame number whose last decimal digit is a "1". Within each such timeslot, a GSM synchronization burst is transmitted (specially constructed to be more easily detectable by a mobile unit 106).

The synchronization burst explicitly contains the corresponding TDMA frame number (equal to the current TDMA frame counter in base station 108). The timeslot number is conveyed implicitly (always "0") and the bit and quarter bit numbers can be deduced by a receiving mobile unit 106 from certain bit markers within the burst (like the beginning and end of explicit bit transmission and certain fixed and known bit patterns). Mobile unit 106 can then set its own timing device 212 to match the timing information conveyed by base station 108. Mobile unit 106 can then use its own internal frequency source to update this timing information synchronized with the updates occurring at base station 108.

Additionally, mobile unit 106 monitors further synchronization bursts from base station 108 and ensures that its own timing information never diverges by more than 2 $\mu$S from base station 108 counters (adjusting its own timing information if this occurs). In this way, any GSM mobile unit 106 maintains an accurate internal version of the transmission timing counters maintained by its local serving base station 108. The accuracy will be within 2 $\mu$S for standard GSM.

Some embodiments of the present invention employ portions of these existing GSM timing features to provide precise network timekeeping by using GPS timing data captured by mobile units 106 and aggregated and maintained at central authority 110. Other wireless networks do not utilize such frame-based timing features. For example, wireless systems utilizing CDMA technologies transmit actual timing information as a specific timing message in the CDMA synchronization channel. Other wireless systems may utilize timing bits or other timing indicators interspersed with messages. Each of these non frame-based systems may also utilize features of embodiments of the present invention to provide precision network timekeeping.

Embodiments of the present invention extend timing features of wireless networks by utilizing GPS timing information captured by mobile units 106 via GPS antenna 112 and GPS receiver 204. Pursuant to some embodiments of the present invention, a wireless network (such as the network 100 depicted in FIG. 1) which has a number of mobile units 106 in communication with a number of base stations 108 may enjoy precision timekeeping through the capture of GPS timing information at mobile units 106 in the network. Network timing information, based on the captured GPS timing information and based on time information maintained by base stations 108, is aggregated and maintained in central authority 110 and forwarded to base stations 108 and mobile units 106 for their use. A network timekeeping method 500 pursuant to some embodiments of the present invention will now be described by referring to FIG. 5.

Network timekeeping method 500 begins at 502 where a mobile unit 106 in the network is operated to capture a GPS signal. Method 500 could be initiated by a variety of events including, for example, events internal to mobile unit 106 (such as expiration of a periodic timer, etc.) and events external to mobile unit 106 (such as the reception of a command from the wireless network from central network authority 110 or the like). In some embodiments, processing at 502, 504 and 506 could be combined with the derivation of a GPS based location estimate for the mobile unit which may also be needed to support some other location based service. In some embodiments, the capture of GPS signal information by mobile unit 106 at 502 may be assisted by other timing information and/or other GPS related information (e.g., almanac data, ephemeris) stored in mobile unit 106 which allows mobile unit 106 (e.g., by ascertaining the approximate positions of GPS satellites which are in-view) to acquire GPS signals more rapidly and/or with higher accuracy and sensitivity. Any timing and GPS related information stored in mobile unit 106 could have been provided earlier by the wireless network including by central authority 110 or obtained from other sources (e.g., different commercial sources of GPS data). Mobile unit 106 may capture varying amounts or types of GPS signal data. Mobile unit 106 is preferably in a location where GPS signal strength and multipath effects are not at the extreme limits of the GPS reception method.

Embodiments of the present invention ensure that network 100 has valid timing information by distributing the task of capturing GPS data to mobile units 106 dispersed throughout the network. For example, some mobile units 106 may be located in positions where GPS signal strength is insufficient to capture valid or accurate GPS data. Embodiments of the present invention are still able to collect up-to-date and accurate timing information from other mobile units 106 in the network. It is likely that, at any given point in time (or at least during any recent time period), at least one mobile unit 106 in each cell 102 will be or will have been in a position to receive valid GPS signal data. Pursuant to embodiments of the present invention, data is only needed from a small number of mobile units 106 in each area served by a base station 108. In some embodiments, a network operator may ensure the capture of valid data by deploying a number of fixed mobile units 106 in areas with good GPS positioning locations (their identities should be known to the network; their exact locations need not be known). According to some embodiments, such fixed mobile units would behave similarly to a normal mobile unit with the likely exception of external enhancements such as improved environmental protection and a reliable power source.

Once mobile unit 106 has captured GPS signal data at 502, processing continues at 504 where a base station time reference is established. In some embodiments, step 504 could precede step 502; in yet other embodiments, the two steps could be concurrent. Each mobile unit 106 maintains timing information indicating a current base station 108 time or receives such timing information from current base station 108 during step 504. In a GSM system, for example, this information is transmitted by each base station 106 using GSM frame data and maintained by the mobile unit 106 as described in the discussion above. Processing at 504 involves marking the base station time at which the GPS signal data is received. For example, mobile unit 106 may mark the identity of the local base station, the GSM frame, the time slot and bit and/or quarter bit numbers corresponding to some precise marker in the GPS signal measurement data.

Processing continues at 506 where an association between GPS time and base station time is derived. In some embodiments, this derivation may be performed by mobile unit 106. In other embodiments, this derivation is performed by central authority 110 based on information transmitted from mobile unit 106. In yet other embodiments, this derivation is started by mobile unit 106 and completed by central authority 110 based on information derived by mobile unit 106. For example, in a first embodiment, processing at 506 includes transmitting digitized and unprocessed GPS signal measurements (captured by mobile unit 106 at 502) as well as the base station time reference (marked by mobile unit 106 at 504) to central authority 110 (via base station 108). Central authority 110 then derives an association between absolute GPS time and a particular marker or markers in the provided GPS signal measurements. Processing at 506 results in the generation of data described above in conjunction with the timing information database of FIG. 4.

In a second embodiment, processing at 506 includes deriving and transmitting intermediate GPS pseudo-ranges (based on GPS information captured by mobile unit 106 at 502) as well as the base station time reference corresponding to these (marked by mobile unit 106 at 504) to central authority 110 (via base station 108). Central authority 110 then derives an association between absolute GPS time and the provided GPS pseudo-ranges. As in the prior embodiment described above, processing at 506 results in the generation of data described in conjunction with the timing information database 400 of FIG. 4.

For example, in embodiments where central authority 110 performs some or all of the derivation, central authority 110 may utilize the information forwarded from mobile unit 106 to derive an association between absolute GPS time and the provided GPS signal measurements. This derivation may be performed, for example, by correlating the GPS navigation message bit sequence expected from each satellite with the GPS signal measurements received at the mobile unit 106. Such a derivation may be performed in any of a number of different ways, including, for example, as described in U.S. Pat. No. 6,150,980 issued Nov. 21, 2000 to Norman F. Krasner, which is incorporated herein by reference for all purposes.

In a further embodiment, processing at 506 is performed primarily at mobile unit 106. For example, processing at 506 may include mobile unit 106 deriving absolute GPS time from the data received at 502. Processing at 506 may also include the derivation of a GPS location estimate or GPS pseudo-ranges, and associating the absolute GPS time with the corresponding base station time reference (marked by the mobile unit 106 at 504). This information (including, for example, absolute GPS time, associated base station time reference and possibly a GPS location estimate or GPS pseudo-ranges) is then sent via base station 108 to central authority 110 for storage.

Once an association between absolute GPS time and the base station time is derived, processing continues to 508 where timing information for the particular base station 108 (e.g. the information in timing information database 400 described above in conjunction with FIG. 4) is updated and stored. This may include updating information for the base station time, absolute GPS time and correlation information. Processing continues at 510 where selective timing information stored at central authority 110 is provided to devices in the network, thereby providing precision timekeeping data to devices in the network. In some embodiments of this invention, processing at 510 could be executed following events other than the completion of processing at 508. For example, processing at 510 may be performed periodically, when timing information has changed significantly or when some specific service requiring timing data needs to be executed.

Pursuant to some embodiments of the present invention, process 500 is continually repeated with respect to all suitably capable mobile units 106 to provide precision network timekeeping. Network 100 continuously updates its association of GPS time to local transmission time for each base station 108 in the network 100 based on data provided from all suitably capable mobile units 106 in the network. This information is stored, for example, in a database accessible to central authority 110 such as timing information database 400. Once this timing information has been captured, updated and maintained, the information may be used to support a number of different applications and uses as described later herein.

Pursuant to some embodiments of the present invention, standard time maintenance techniques in a wireless network may be enhanced. For example with GSM, each mobile unit 106 may employ a more accurate and stable internal frequency source than the 0.1 ppm accuracy mandated by standard GSM. As a result, the divergence of mobile unit 106 time from base station 108 time will be reduced, and the need to resynchronize each mobile unit 106 with the base station 108 by monitoring synchronization bursts will also be reduced. This will result in generally more accurate and reliable time maintenance by the method described herein.

Further, embodiments of the present invention allow mobile units 106 to use more accurate internal frequency sources and to more precisely time the arrival of base station 108 transmission information. Further, in GSM systems, each mobile unit 106 could maintain additional timing information to track smaller fractions of 1 bit timing—e.g. 1/256 of a bit—thereby enabling each mobile unit 106 to report base station 108 timing to very fine granularity. Each mobile unit 106 could also monitor base station 108 timing more often to reduce its divergence from base station 108 timing even when this was significantly less than 2 µs. (Note that even with a very accurate and stable mobile unit 106 frequency source, divergence may still occur due to instability in the base station 108 frequency source). In a GSM system, these measures could be necessary if GPS time association was needed with an accuracy much better than around 2 µs though not otherwise.

Figure 5:
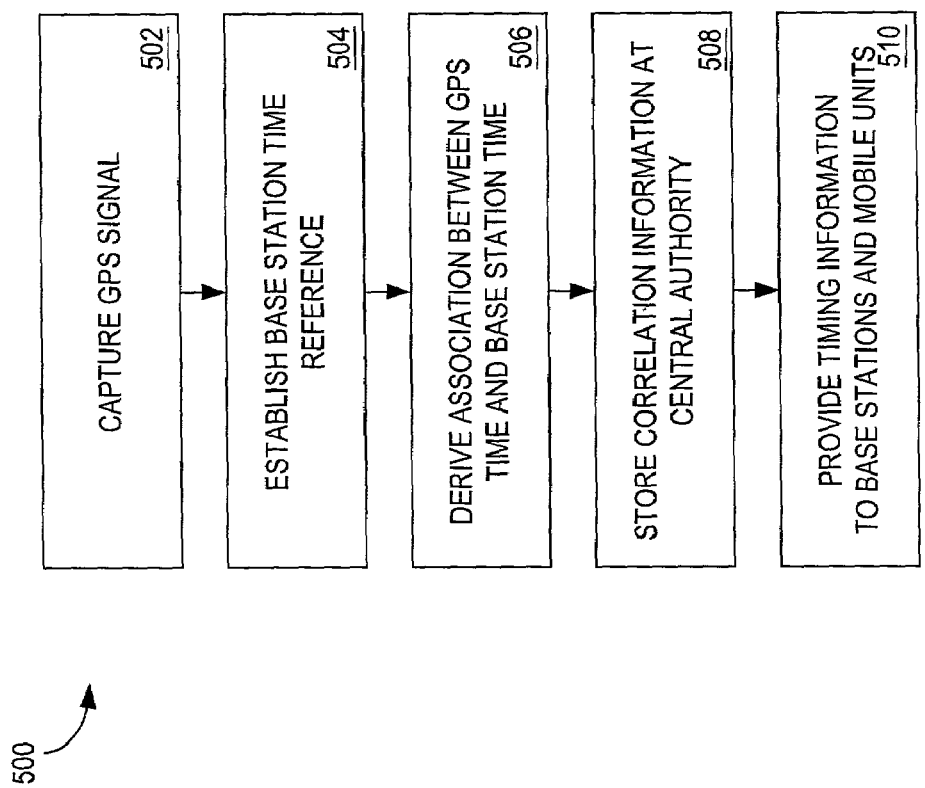
FIG. 5 is a flow diagram illustrating a process for updating network timing data in the wireless network of FIG. 1 according to one embodiment of the present invention.

In some embodiments, algorithms associated with the execution of steps 506 and 508 in FIG. 5 may be utilized to appropriately combine, average and weight timing associations for the same base station 108 obtained from different mobile units 106 or from the same mobile unit 106 at different times in order to take account of better timing association accuracy in areas with clearer GPS satellite visibility. In such embodiments, the entity performing or making use of the GPS time derivation (e.g., either the mobile unit 106 or the central authority 110) needs to identify when sufficient GPS signal strength is present to allow such use. For mobile units 106 in a low GPS signal strength environment, GPS time association need not be derived or need not be used in updating base station timing data.

In some embodiments, if it is required to maintain GPS to local base station transmission timing with an accuracy better than around 100 microseconds generally (or better than around 10 microseconds in a suburban or urban environment), then a correction to the GPS timing association derivation described so far may be applied to take account of the propagation delay from the base station 108 to the mobile unit 106. When gathering GPS timing association, the GPS location estimate of the mobile unit 106 may also be obtained as already described. This location estimate together with the known location and, if needed, known or provided internal electrical signaling delays of the base station leads directly to a precise estimate of the propagation delay in the absence of significant multipath and the use of repeaters. When significant multipath or repeaters are known or suspected to be present, and their effects on propagation delay cannot be accurately determined, the GPS timing association obtained by a particular mobile unit 106 need not be used by network central authority 110. If the propagation delay cannot be accurately obtained in this way for a sufficient number of mobile units (e.g. no reliable GPS location estimate is obtained for the mobile unit), then in some wireless technologies like GSM, a separate wireless network measurement related to propagation delay may be available.

In the case of GSM, such a measurement is the "Timing Advance" used to synchronize handset transmission timing to local base station transmission timing: this measurement allows the base station to handset propagation time to be easily calculated and would normally include some of the effects of any multipath and/or repeaters. The propagation delay so obtained is then added to the base station transmission timing reference provided by the mobile unit 106 to obtain the actual transmission timing at the base station 108 itself. In any wireless network where the propagation delay cannot be reliably estimated or is neglected, the mobile unit can be assumed to be located at the base station site: this will lead to a GPS timing inaccuracy of up to around 100 microseconds in a rural area (for a mobile unit 106 up to 30 kilometers distant from serving base station 108) and up to around 10 or 3 microseconds in a suburban or urban area, respectively (for a mobile unit 106 up to 3 kilometers or 1 kilometer distant, respectively, from serving base station 108). Such an inaccuracy may be tolerable for some applications.

When the above correction is applied to maintain timing information, the same type of correction will be needed when timing information is transferred to any mobile unit 106. In this case, the mobile unit (or the network) must subtract an estimate for the base station 108 to mobile unit 106 propagation delay from the transmission timing value for the base station 108. The estimate for the propagation delay could be obtained by the network or mobile unit using the methods described above.

Networks performing timekeeping pursuant to embodiments of the present invention could achieve timing accuracies as good as 100 nanoseconds or better when timing associations are used only from mobile units with good GPS signal strength, negligible GPS multipath and negligible wireless multipath and repeater effects. Given the two former conditions, it is known that GPS time derivation will be accurate to around 30 nanoseconds, while the two latter conditions enable determination of base station to mobile unit propagation delay from the geographical locations of these entities and known base station internal signaling delays to around the same accuracy. If the association between base station and GPS time is then determined by each mobile unit to within 1 microsecond on average (which is, for example, possible in the GSM system), and provided this error is an independent random variable with a mean of zero (when errors due to time lag and time advance are treated with opposite sign), then those versed in the art may verify that averaging the time associations from around 100 mobile units in the same cell will result in around 100 nanoseconds overall error.

Some specific applications of maintaining accurate timing information, as described previously herein, are now described. In some embodiments, the timing information maintained by the network (e.g. central authority) may be employed by the central authority or another device to assist with positioning methods like GSM E-OTD. As described earlier herein, E-OTD positioning requires the availability of the relative timing differences between pairs of base stations: such relative timing differences can easily be obtained from the absolute timing associations provided by this invention. In some embodiments, the timing information may be provided to base stations 108 on a regular basis to ensure accurate absolute time is maintained at each station. As previously mentioned herein, base stations may use absolute timing information to synchronize transmission and/or to support certain network centric geographic positioning methods.

In embodiments where mobile unit 106, either to support acquisition of timing association data according to this invention or to support GPS positioning, computes GPS pseudoranges or a GPS location estimate, network 100 may provide GPS to local base station transmission association data to the mobile unit 106 to assist these tasks. This may apply regardless of whether or not any timing association data subsequently obtained by or from the mobile unit is used to update timing association data maintained by the network.

More details on the application of this invention to support GPS positioning are now described. Assisted GPS (A-GPS) is a positioning method involving GPS measurements in which previously known, previously derived, or previously measured additional data associated with GPS satellites (e.g., ephemeris data, almanac data, etc.) is use to help obtain and subsequently process GPS signal measurements to yield a location estimate or intermediate measurement data (e.g., pseudo-ranges) with improved performance characteristics (e.g., greater accuracy and sensitivity) over that obtained without such assistance data. For positioning a mobile unit in a network, the assistance data may be used at the mobile unit, at the central authority, or in both.

A number of A-GPS positioning methods are used for which accurate knowledge of the absolute GPS time at which GPS satellite measurements were or will be obtained can improve sensitivity, accuracy and reliability and reduce delay (or the amount of GPS signal data required) in computing both intermediate data (e.g., pseudo-ranges) and a GPS position estimate. The required level of accuracy of GPS time and the precise performance related benefits vary from one position method to another. In general, the beneficial accuracy range for GPS time is in the range from around 1 microsecond to approximately 10 milliseconds.

Embodiments of the present invention further permit the improvement of A-GPS positioning of a mobile unit 106 that has just powered on or moves into in an area of low GPS signal strength (e.g. deep inside a building or in a subway or shopping mall) for a prolonged time. That is, unlike prior devices where accurate GPS timing association may not be available until after the mobile unit has performed initial A-GPS positioning or has moved into an area of higher GPS signal strength, embodiments of the present invention enable accurate GPS timing association to be available initially and thereby to improve A-GPS positioning performance. Embodiments of the present invention may utilize timing information maintained at central authority 110, allowing quick and accurate A-GPS positioning of mobile units.

Those skilled in the art will appreciate that various adaptations and modifications of the just described preferred embodiments can be configured without departing from the scope and spirit of the invention. Although one embodiment has been described which provides network timekeeping in a GSM network, those skilled in the art will recognize that features of embodiments of the present invention may be utilized to provide improved timekeeping in other types of networks as well. Therefore, it is to be understood that, within the scope of the appended claims, the invention may be practiced other than as specifically described herein.

What is claimed is

1. A method for updating timing information in a wireless communication network of base stations, where each base station maintains timing information, comprising:
   receiving, at at least one mobile unit in an area serviced by a base station,
      the timing information maintained by the respective base station; and
      signal data containing accurate timing information, from a source other than a base station;
   deriving accurate timing information from the signal data received at the mobile unit;
   for each mobile unit, creating an association comprising the accurate timing information and the timing information received from the base station; and
   in response to the association, updating the timing information maintained by at least one base station.

2. The method of claim 1, further comprising providing at least a portion of the association to at least one base station in the wireless communication network.

3. The method of claim 2, providing at least a portion of the association to a plurality of base stations in the wireless communication network.

4. The method of claim 1, where receiving signal data comprises receiving global positioning satellite signal data.

5. The method of claim 4, where receiving global positioning satellite signal data comprises receiving the data via a global positioning satellite antenna or a wireless communications antenna.

6. The method of claim 4, deriving accurate timing information from the signal data comprises deriving the information from the signal data, at the mobile unit.

7. The method of claim 4, further comprising
   identifying the base station providing timing information;
   forwarding the identity of the base station, the timing information received from the base station, and the accurate timing information derived from the signal data, to a central authority; and
   creating the association at the central network authority, where the association further comprises the identity of the base station.

8. The method of claim 4, where deriving accurate timing information from the signal data comprises deriving the information from the signal data, at a central network authority.

9. The method of claim 8, further comprising
   identifying the base station providing timing information;
   forwarding the identity of the base station, the timing information received from the base station, and the signal data, to the central authority; and
   creating the association at the central network authority, where the association further comprises the identity of the base station.

10. The method of claim 1, where
   creating an association comprises creating an association at the mobile unit; and
   further comprising providing the association to a central network authority.

11. The method of claim 10, further comprising storing the association at the central network authority.

12. The method of claim 11, further comprising updating the stored association.

13. The method of claim 1, where receiving signal data containing accurate timing information comprises repeatedly receiving signal data.

14. The method of claim 1, where receiving signal data containing accurate timing information comprises selectively receiving signal data.

15. The method of claim 1, further comprising providing the association to another mobile unit.

16. The method of claim 1,
   where receiving timing information from the base station comprises receiving propagation delay information; and
   further comprising adjusting the timing information maintained by the base station in response to the propagation delay information.

17. A network timing system for a wireless communication network of base stations where each base station maintains timing information, comprising:
   at least one mobile unit in an area served by a base station, the mobile unit comprising
      a first receiver comprising means for receiving timing information maintained by the respective base station; and
      a second receiver comprising means for receiving signal data from a source other than a base station, the signal data comprising accurate timing information;
   a processing device comprising means for deriving accurate timing information from the signal data received at the mobile unit; and
   a central network authority comprising means for receiving the accurate timing information and the timing information received by the mobile unit from the base station;

means for creating an association between the accurate timing information and the timing information received from the base station; and means, responsive to the association, for updating the timing information maintained by at least one base station.

18. The network timing system of claim 17, where the processing device is located at a mobile unit or the central network authority.

19. The network timing system of claim 17, where the central network authority comprises means for providing at least a portion of the association to a plurality of the base stations.

20. The network timing system of claim 17, where the central network authority further comprises means for providing at least a portion of the association to at least one mobile unit.

21. The network timing system of claim 17, where
the signal data is comprises global positioning satellite signal data; and
the processing device comprises means for deriving global positioning satellite timing information from the global positioning satellite signal data.

22. The network timing system of claim 21, where the association further comprises the identity of the base station.

23. The network timing system of claim 17,
where the timing information received from the base station further comprises propagation delay information; and
further comprising means, responsive to the propagation delay information, for adjusting the timing information maintained by the base station.

24. A network timing method for a network comprising a central network authority and a plurality of areas each serviced by at least one base station, where the base station maintains timing information, comprising:

receiving, at a mobile unit in one of the areas,
the timing information maintained by the base station; and
global positioning satellite signal data;

deriving, at the mobile unit or the central network authority, global positioning satellite timing information from the signal data;

creating an association comprising the global positioning satellite timing information and the timing information received from the base station; and in response to the association, updating the timing information maintained by the base station.

* * * * *